(12) United States Patent
Porras et al.

(10) Patent No.: US 9,260,103 B2
(45) Date of Patent: *Feb. 16, 2016

(54) SYSTEM AND METHOD FOR CONTROLLING A VEHICLE HAVING AN ELECTRIC HEATER

(71) Applicant: FORD GLOBAL TECHNOLOGIES, LLC, Dearborn, MI (US)

(72) Inventors: Angel Fernando Porras, Dearborn, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,664

(22) Filed: Mar. 12, 2013

(65) Prior Publication Data

US 2014/0114515 A1 Apr. 24, 2014

Related U.S. Application Data

(60) Provisional application No. 61/719,474, filed on Oct. 19, 2012.

(51) Int. Cl.
| | |
|---|---|
| *B60W 20/00* | (2006.01) |
| *B60W 10/06* | (2006.01) |
| *B60W 10/08* | (2006.01) |
| *B60W 10/30* | (2006.01) |

(Continued)

(52) U.S. Cl.
CPC ........... *B60W 20/00* (2013.01); *B60H 1/00385* (2013.01); *B60H 1/2218* (2013.01); *B60L 1/02* (2013.01); *B60L 11/123* (2013.01); *B60L 11/14* (2013.01); *B60W 10/06* (2013.01); *B60W 10/08* (2013.01); *B60W 10/26* (2013.01); *B60W 10/30* (2013.01); *B60W 20/106* (2013.01); *B60W 20/20* (2013.01); *B60W 20/50* (2013.01); *B60H 2001/2253* (2013.01); *B60K 6/445* (2013.01); *B60L 2210/40* (2013.01); *B60L 2240/36* (2013.01); *B60L 2240/445* (2013.01); *B60W 2050/0089* (2013.01); *F02D 29/02* (2013.01); *Y02T 10/6217* (2013.01); *Y02T 10/6239* (2013.01); *Y02T 10/6286* (2013.01); *Y02T 10/7077* (2013.01); *Y02T 10/7241* (2013.01); *Y10S 903/93* (2013.01)

(58) Field of Classification Search
None
See application file for complete search history.

(56) References Cited

U.S. PATENT DOCUMENTS

| | | |
|---|---|---|
| 3,626,148 A | 12/1971 | Woytowich et al. |
| 4,520,258 A | 5/1985 | Grohmann |

(Continued)

*Primary Examiner* — Thomas Tarcza
*Assistant Examiner* — Richard Goldman
(74) *Attorney, Agent, or Firm* — David B. Kelley; Brooks Kushman P.C.

(57) ABSTRACT

A system and method for operating an electric heater to determine heater functionality is based on actual heater power consumption relative to expected heater power consumption during operating conditions where electrical power consumption by other system components can be accurately estimated. One or more components, including a second heating source, may be controlled based on the heater functionality. The system may include a hybrid vehicle having an engine, an electric heater and heater core, a valve positioned to route coolant through the engine and/or the electric heater, and a controller configured to store a diagnostic code and/or start the engine when the electric heater is commanded on and when the actual energy consumption of the electric heater is below a corresponding threshold.

20 Claims, 3 Drawing Sheets

(51) Int. Cl.
*B60L 1/02* (2006.01)
*B60L 11/12* (2006.01)
*B60L 11/14* (2006.01)
*B60W 10/26* (2006.01)
*B60H 1/00* (2006.01)
*B60H 1/22* (2006.01)
*F02D 29/02* (2006.01)
*B60K 6/445* (2007.10)
*B60W 50/00* (2006.01)

(56) References Cited

U.S. PATENT DOCUMENTS

| | | | |
|---|---|---|---|
| 4,591,691 A | 5/1986 | Badali | |
| 4,605,163 A | 8/1986 | Hayashi | |
| 4,744,335 A | 5/1988 | Miller | |
| 4,744,336 A | 5/1988 | Miller | |
| 5,012,070 A | 4/1991 | Reed | |
| 5,048,752 A | 9/1991 | Hintennach et al. | |
| 5,501,267 A * | 3/1996 | Iritani | B60H 1/00007 165/11.1 |
| 5,549,153 A | 8/1996 | Baruschke et al. | |
| 5,566,774 A * | 10/1996 | Yoshida | B60K 6/28 180/309 |
| 5,600,949 A * | 2/1997 | Kato | F01N 3/2013 60/284 |
| 5,624,003 A | 4/1997 | Matsuki et al. | |
| 5,678,760 A | 10/1997 | Muso et al. | |
| 5,725,048 A | 3/1998 | Burk et al. | |
| 5,752,655 A | 5/1998 | Kodama et al. | |
| 6,010,076 A * | 1/2000 | Winik | B60H 1/034 123/142.5 R |
| 6,032,869 A | 3/2000 | Ito et al. | |
| 6,037,567 A * | 3/2000 | Inoue | B60H 1/2225 165/299 |
| 6,078,024 A * | 6/2000 | Inoue | F28D 1/05366 165/299 |
| 6,105,876 A | 8/2000 | Hennrich et al. | |
| 6,178,292 B1 * | 1/2001 | Fukuoka | F24H 1/009 165/175 |
| 6,213,233 B1 | 4/2001 | Sonntag et al. | |
| 6,265,692 B1 * | 7/2001 | Umebayahi | B60H 1/00064 165/299 |
| 6,270,015 B1 | 8/2001 | Hirota | |
| 6,575,258 B1 * | 6/2003 | Clemmer | B60K 11/02 165/41 |
| 6,595,165 B2 | 7/2003 | Fishman et al. | |
| 6,598,671 B1 | 7/2003 | Zeng et al. | |
| 6,601,545 B1 | 8/2003 | Hohl | |
| 6,607,142 B1 | 8/2003 | Boggs et al. | |
| 6,616,059 B2 | 9/2003 | Sabhapathy et al. | |
| 6,713,729 B2 | 3/2004 | Takeo et al. | |
| 6,786,191 B2 | 9/2004 | Foster | |
| 6,897,416 B2 * | 5/2005 | Bohlender | B60H 1/00978 219/202 |
| 6,990,821 B2 * | 1/2006 | Singh | G05B 15/02 236/94 |
| 7,098,429 B2 * | 8/2006 | Angermann | F24H 3/0429 219/202 |
| 7,200,327 B2 * | 4/2007 | Pierron | B60H 1/2225 165/148 |
| 7,380,586 B2 | 6/2008 | Gawthrop | |
| 7,591,143 B2 | 9/2009 | Zeigler et al. | |
| 7,591,303 B2 | 9/2009 | Zeigler et al. | |
| 7,870,892 B2 | 1/2011 | Gawthrop | |
| 7,971,799 B2 * | 7/2011 | Colette | B60H 1/2225 165/41 |
| 8,052,066 B2 * | 11/2011 | Watanabe | B60H 1/004 123/41.1 |
| 8,402,776 B2 | 3/2013 | Johnston et al. | |
| 8,540,166 B2 | 9/2013 | Nemoto et al. | |
| 8,689,741 B2 | 4/2014 | Park et al. | |
| 2002/0053325 A1 | 5/2002 | Fishman et al. | |
| 2002/0096130 A1 | 7/2002 | Fishman et al. | |
| 2003/0127528 A1 | 7/2003 | Sabhapathy et al. | |
| 2003/0183619 A1 * | 10/2003 | Bohlender | B60H 1/00978 219/494 |
| 2004/0031452 A1 | 2/2004 | Yamazaki | |
| 2005/0063727 A1 * | 3/2005 | Quinones | G03G 15/0258 399/100 |
| 2006/0222015 A1 * | 10/2006 | Kafka | H04L 29/06027 370/477 |
| 2008/0271937 A1 * | 11/2008 | King | B60K 6/20 180/165 |
| 2009/0179080 A1 | 7/2009 | Alston | |
| 2009/0248215 A1 * | 10/2009 | Tanaka | G05B 17/02 700/291 |
| 2009/0283604 A1 | 11/2009 | Martinchick et al. | |
| 2009/0308335 A1 | 12/2009 | Dipaola et al. | |
| 2010/0094476 A1 * | 4/2010 | Hamilton, II | G01D 4/004 700/295 |
| 2010/0140246 A1 * | 6/2010 | Grider | B60K 6/48 219/205 |
| 2010/0186685 A1 | 7/2010 | Hiyama | |
| 2010/0187211 A1 * | 7/2010 | Eisenhour | B60H 1/00742 219/202 |
| 2010/0206957 A1 * | 8/2010 | Vyas | B60H 1/00428 236/46 R |
| 2010/0288745 A1 * | 11/2010 | Brust | B60H 1/2218 219/205 |
| 2011/0107773 A1 | 5/2011 | Gawthrop | |
| 2011/0127246 A1 * | 6/2011 | Heiden | B60L 1/02 219/202 |
| 2011/0233189 A1 * | 9/2011 | Reiss | B60H 1/2218 219/492 |
| 2011/0270489 A1 * | 11/2011 | Gustmann | B60L 3/0007 701/36 |
| 2012/0004801 A1 * | 1/2012 | Watanabe | F01N 3/2026 701/22 |
| 2012/0118988 A1 | 5/2012 | Lee et al. | |
| 2012/0179319 A1 * | 7/2012 | Gilman | B60W 50/0097 701/22 |
| 2012/0179329 A1 * | 7/2012 | Okamoto | B60H 1/00735 701/36 |
| 2012/0185108 A1 * | 7/2012 | Howe | H02J 3/14 700/295 |
| 2012/0216983 A1 | 8/2012 | Bennion et al. | |
| 2012/0290865 A1 * | 11/2012 | Kansal | G06F 1/3203 713/340 |
| 2012/0324868 A1 * | 12/2012 | Kim | F01N 3/0835 60/274 |
| 2013/0030634 A1 * | 1/2013 | Endo | B60K 6/46 701/22 |
| 2013/0073734 A1 * | 3/2013 | Bedingfield | H04L 29/06027 709/226 |
| 2013/0096753 A1 * | 4/2013 | Severinsky | B60H 1/004 701/22 |
| 2013/0119042 A1 * | 5/2013 | Eisenhour | B60H 1/00742 219/202 |
| 2013/0131883 A1 * | 5/2013 | Yamada | H02J 3/14 700/295 |
| 2013/0211650 A1 * | 8/2013 | Tashiro | B60W 10/06 701/22 |
| 2013/0292482 A1 * | 11/2013 | Hashigaya | B60H 1/00007 237/28 |
| 2013/0297191 A1 * | 11/2013 | Gibson | F02N 11/0855 701/112 |
| 2014/0012450 A1 * | 1/2014 | Laing | B60L 11/14 701/22 |
| 2014/0110081 A1 * | 4/2014 | Porras | F01P 11/04 165/11.1 |
| 2014/0114515 A1 * | 4/2014 | Porras | B60H 1/00385 701/22 |
| 2014/0131124 A1 * | 5/2014 | Severinsky | B60H 1/004 180/65.245 |

* cited by examiner

SYSTEM AND METHOD FOR CONTROLLING A VEHICLE HAVING AN ELECTRIC HEATER

CROSS-REFERENCE TO RELATED APPLICATIONS

This application claims the benefit and priority of U.S. Provisional Application Ser. No. 61/716,474 filed on Oct. 19, 2012 titled "System and Method for Controlling a Vehicle having an Electric Heater," the disclosure of which is hereby incorporated by reference in its entirety.

TECHNICAL FIELD

The present disclosure relates to a heating control strategy for a vehicle having an electric heater.

BACKGROUND

Electrical heating systems may be utilized to supplement the heat provided by an engine and to heat the passenger compartment of a vehicle. While often used in electric vehicles powered solely by a traction battery and hybrid electric vehicles having an internal combustion engine in combination with a fraction battery, such heating systems may also be found in other applications. For example, electric heating systems may be utilized in air conditioners, dehumidifiers, dryers, portable heaters and other electrical appliances.

To provide passenger comfort in vehicle applications, vehicles have the capability to heat or cool the passenger compartment. Conventional vehicles use waste heat from the engine as the sole source of heating for the passenger compartment. With the advent of Battery Electric Vehicles (BEV), there is little or no waste heat available for use in heating the vehicle cabin. As such, BEVs may use an electric heater to warm the passenger compartment. Similarly, although Hybrid Electric Vehicles (HEV) include a small internal combustion engine that may provide some waste heat for heating the vehicle cabin, these vehicles are designed to minimize the use of the engine to maximize fuel economy. As such, these vehicles pose different heating challenges because the engine may not always be running and generating waste heat for use by the heating system. Plug-in Hybrid Electric Vehicles (PHEV) compound this issue by running with the engine off for significant periods of time. To provide optimal fuel economy benefits, it is desired to heat the passenger compartment without having to rely solely on engine waste heat.

As such, various alternatives have been developed to heat the passenger compartment of electric and hybrid electric vehicles. One such solution uses an electric heater as a heat source to provide heat for electric vehicles or supplement heat from the engine in hybrid vehicles when engine waste heat is insufficient to meet a heating demand for the vehicle cabin. An electric heater generally contains one or more heating elements that function as electrical resistors that convert electricity to heat. Electric heaters may include a thermostat to regulate the heat output. Alternatively, electric heaters may include Positive Temperature Coefficient (PTC) heating elements. PTC heating elements are made of small ceramic stones that have an increasing electrical resistance as temperature increases to provide self-limiting temperature properties such that a thermostat is not required. In addition, PTC heaters have fast heating response times and the ability to automatically vary resistance and associated current/power to maintain a pre-defined temperature.

Various commercially available component electric heaters may include some integrated diagnostic or self-test functions to determine heater operating state. However, these diagnostics may not be sufficient or suitable for some applications. In particular, integrated heater diagnostics may not provide sufficient or timely feedback to determine whether the heater is functioning as desired for a particular application. In vehicle applications, these diagnostics may take several key cycles to detect or report various operating conditions, may be unable to detect some operating anomalies, and/or may not have desired accuracy or granularity in detecting various conditions.

SUMMARY

A system and method for operating an electric heater to determine heater functionality based on actual heater power consumption relative to expected heater power consumption during operating conditions where electrical power consumption by other system components can be accurately estimated is disclosed. The system and method may also include controlling one or more components to control a second heating source based on the heater functionality.

In one embodiment, a hybrid vehicle includes an engine, an electric heater, a heat exchanger or heater core, a valve positioned to route coolant through at least one of the engine and the electric heater to the heater core, and a controller configured to store a diagnostic code when the electric heater is commanded on and when actual electric heater power consumption is below a corresponding threshold associated with an expected electric heater power consumption. In various embodiments, measured and/or estimated electric heater power consumption is determined during vehicle operating conditions where other electrical power consuming components are off or operating in a state with known power consumption. Embodiments may also include starting the engine to provide heat to vehicle components and/or the vehicle cabin. In one embodiment, a sensor configured to measure coolant temperature exiting the electric heater provides a corresponding signal to the controller and the controller estimates an expected electric heater power consumption based on the coolant temperature and commanded duty cycle of the electric heater.

Embodiments according to the present disclosure may include a method for controlling a hybrid vehicle having an engine and an electric heater that includes receiving a heat request and estimating an actual energy consumption of the electric heater. The actual energy consumption may be based on an actual power consumption of the electric heater integrated over a predetermined interval of time, where the actual power consumption is further based on a measured vehicle power consumption adjusted for power consumed by at least one vehicle component. The method also includes comparing the actual energy consumption of the electric heater with a corresponding threshold and storing a diagnostic code when the actual energy consumption is below the corresponding threshold. The corresponding threshold may be based on an expected electric heater power consumption estimated from coolant temperature and current duty cycle, where coolant temperature may be obtained from a corresponding sensor measuring coolant temperature exiting the electric heater. Additionally, the measured electric heater power consumption is based on power supplied from the traction battery and the at least one vehicle component may include at least a DC/DC converter, an inverter system controller and/or an electric compressor.

In various embodiments, a method for controlling a vehicle having an engine and an electric heater may include commanding the electric heater on and starting the engine when an actual electric heater power consumption, based on measured vehicle power consumption adjusted for power consumed by at least one vehicle component, is below a corresponding threshold. The actual electric heater power consumption may be averaged over a predetermined interval of time, integrated over a period of time or may be based on an instantaneous measurement of power consumption. The method may further include controlling a valve to selectively route coolant from the engine to a heater core to heat the vehicle when the actual electric heater power consumption is below the corresponding threshold.

Embodiments according to the present disclosure provide various advantages. For example, control of an electric heater and/or vehicle with an electric heater according to various embodiments performs opportunistic diagnostic testing under operating conditions where operating states of other electric consumers are known to provide more accurate and timely feedback of electric heater functionality based on estimated heater power consumption relative to expected heater power consumption. Embodiments of the present disclosure provide additional diagnostic granularity to more particularly identify various operating conditions associated with heater functionality and related electrical system components to facilitate repair operations.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various embodiments of a heating control strategy according to the present disclosure may be implemented in vehicles, which may include vehicles having a powertrain with a single propulsion device, such as an internal combustion engine or an electric machine (motor/generator or traction motor) powered by a fraction battery, for example. Vehicles may also have two or more propulsion devices. For example, the vehicle may have an engine and an electric motor, a fuel cell and an electric motor, or other combinations of propulsion devices as are known in the art. The engine may be a compression or spark ignition internal combustion engine, or an external combustion engine, and the use of various fuels is contemplated. In one example, the vehicle is a hybrid electric vehicle (HEV) having an internal combustion engine and a battery powered traction motor, and additionally may have the ability to connect to an external electric grid, such as in a plug-in hybrid electric vehicle (PHEV). The PHEV structure is used in the figures and to describe the various embodiments below; however, it is contemplated that the various embodiments may be used with vehicles having other propulsion devices or combinations of propulsion devices as is known in the art.

A plug-in Hybrid Electric Vehicle (PHEV) involves an extension of existing Hybrid Electric Vehicle (HEV) technology, in which an internal combustion engine is supplemented by a traction battery and at least one electric machine to further gain increased mileage and reduced vehicle emissions. A PHEV uses a larger capacity battery than a standard hybrid vehicle, and adds a capability to recharge the battery from an electric power grid, which supplies energy to an electrical outlet at a charging station. This further improves the overall vehicle system operating efficiency in an electric driving mode and in a hydrocarbon/electric blended driving mode.

Figure 1:
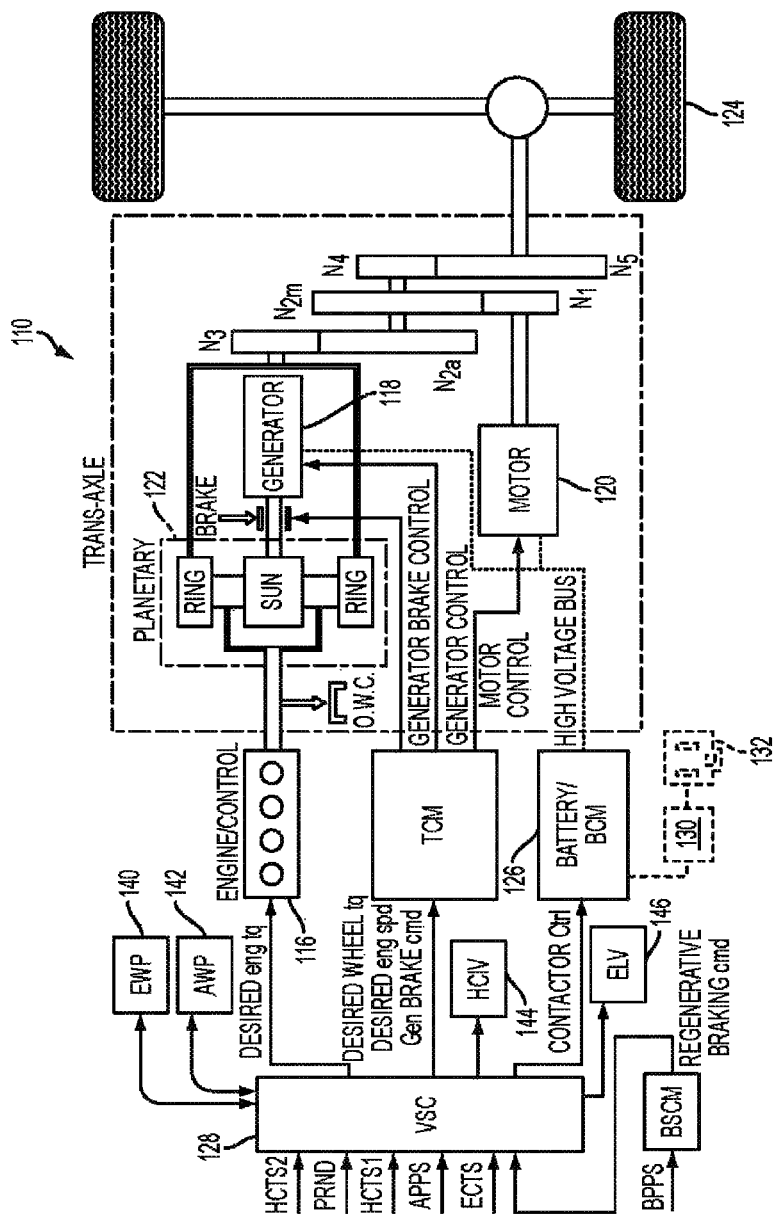
FIG. 1 is a schematic of a representative embodiment illustrating operation of a heating control strategy for a hybrid vehicle according to the present disclosure.

FIG. 1 illustrates an HEV 110 powertrain configuration and control system. A power split HEV 110 may be a parallel HEV. The HEV configuration as shown is for example purposes only and is not intended to be limiting as the present disclosure applies to BEVs, HEVs and PHEVs of any suitable architecture. In this powertrain configuration, there are two power sources that are connected to the driveline, which includes a combination of engine and generator subsystems using a planetary gear set 122 to connect to each other, and the electric drive system (motor, generator, and battery subsystems). The battery subsystem is an energy storage system for the generator and the motor. The changing generator speed will vary the engine output power split between an electrical path and a mechanical path. In a vehicle 110 with a power split powertrain system, unlike conventional vehicles, the engine 116 requires either the generator torque resulting from engine speed control or the generator brake torque to transmit its output power through both the electrical and mechanical paths (split modes) or through the all-mechanical path (parallel mode) to the drivetrain for forward motion as is generally known in the art.

During operation using the second power source, the electric motor 120 draws power from the battery 126 and provides propulsion independently of the engine 116 for forward and reverse motions. This operating mode is called "electric drive" or electric-only mode or EV mode. The operation of this power split powertrain system, unlike conventional powertrain systems, integrates the two power sources to work together seamlessly to meet the driver's demand without exceeding the system's limits (such as battery limits) while optimizing the total powertrain system efficiency and performance.

As shown in FIG. 1, a vehicle system controller (VSC) 128 coordinates control of the powertrain in addition to implementing the vehicle heating strategy as illustrated and described in greater detail with reference to FIG. 2. Under normal powertrain conditions, the VSC 128 interprets the driver's demands (e.g. PRND and acceleration or deceleration demand), and then determines the wheel torque command based on the driver demand and powertrain limits. In addition, the VSC 128 determines when and how much torque each power source needs to provide in order to meet the driver's torque demand and to achieve the operating point (torque and speed) of the engine. The battery 126 may be additionally rechargeable in a PHEV vehicle 110 configuration (shown in phantom), using a receptacle 132 which is connected to the power grid or other outside electrical power source and is coupled to battery 126, possibly through a battery charger/converter 130.

The vehicle 110 may be operated in electric vehicle mode (EV mode), where the battery 126 provides all of the power to the electric motor 120 to operate the vehicle 110. In addition to the benefit of saving fuel, operation in EV mode may enhance the ride comfort through lower noise and better driveability, e.g., smoother electric operation, lower noise, vibration, and harshness (NVH), and faster response. Operation in EV mode also benefits the environment with zero emissions from the vehicle during this mode. However, operation in EV mode provides little or no waste heat that can be used to heat the passenger cabin, or to heat various other vehicle components to provide desired vehicle performance or emissions control when starting and running engine 116, for example. Vehicle 110 may include a climate control system with various climate control functions coordinated by controller 128. Alternatively, a separate climate control computer may be provided and may communicate with VSC 128 over a wired or wireless network using a standard protocol, such as the controller area network (CAN) protocol, for example. The VSC may include various inputs (e.g., engine coolant temperature sensor (ECTS) and heater core temperature sensors (HCTS1, HCTS2)), and outputs connected to sensors and actuators to control heating and cooling of the vehicle cabin and/or vehicle components in response to operator input and/or vehicle and ambient operating conditions. For example, VSC 128 may include outputs connected to the electric water pump (EWP) 140, the auxiliary water pump (AWP) 142, heater core isolation valve (HCIV) 144 and the engine coolant valve (ECV) 146. A human-machine interface (HMI) implemented using voice activation, touch screen, and/or knobs, sliders, and buttons, may be used to set a desired cabin temperature or operating mode that is used by VSC 128 and/or a climate control system computer to implement the vehicle heating strategy as described in greater detail herein.

Various approaches are taken to meet a vehicle heating demand, which may be based on operator input and/or ambient operating conditions as previously described. Referring to FIG. 2, one embodiment for a vehicle heating strategy for heating the passenger compartment of a hybrid vehicle is shown. The system or method for vehicle heating illustrated in FIG. 2 provides two sources of coolant heating. The system may use heat from the engine 116 to heat the coolant, as in a conventional vehicle using an internal combustion engine. The system may also use an electric heater 224, implemented by a positive temperature coefficient (PTC) heater in this embodiment, to heat the coolant. Having multiple sources of heat allows flexibility during normal operating conditions and some redundancy during operating conditions where heat from one source is insufficient or unavailable. Coolant from the different heat sources flows through the heater core 230. The system may use an HCIV 144 that selectively routes coolant from the different heat sources. A VSC module 128 (shown in FIG. 1) may control the operation of the system, or may coordinate control of the system with a climate control computer or control module as previously described. The VSC module 128 may determine the heating mode based on the heat request and the status of the various components in the heating system, and in particular, the status of electric heater 224.

Figure 2:
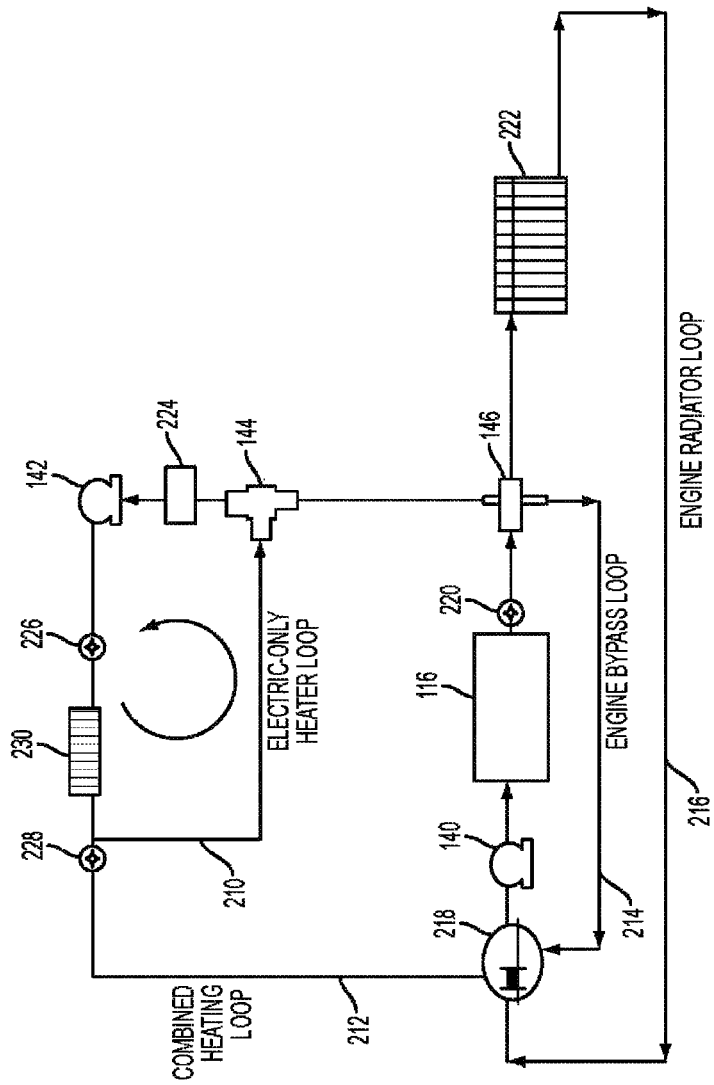
FIG. 2 is a schematic representation of an engine coolant circuit for a vehicle according to an embodiment of the present disclosure.

Still referring to FIG. 2, the system may also utilize AWP 142 and EWP 140 to push coolant through the system. Multiple temperature sensors may be utilized to measure the temperature of coolant entering and exiting the heater core 230. For example, a first heater core temperature sensor (HCTS1) 226 may be included to measure the temperature of coolant exiting the electric heater 224 and a second heater core temperature sensor (HCTS2) 228 may be included to measure temperature of coolant exiting the heater core 230. The system may also have a radiator 222 to dissipate heat in the coolant and a thermostat 218 to control the flow of coolant between the radiator 222 and the engine 116.

As shown in FIG. 2, multiple coolant paths are available for heating coolant. Coolant paths depicted include an electric-only heating loop 210, a combined heating loop 212, an engine radiator loop 216 and an engine bypass loop 214. The electric-only heating loop 210 routes coolant through electric heater 224, AWP 142, HCT sensors 226, 228 and heater core 230. In this heating loop, the electric heater 224 solely heats the coolant independent of any coolant flowing through the engine. More specifically, AWP 142 circulates coolant through heater core 230 and electric heater 224.

In the combined heating loop 212, both the engine 116 and the electric heater 224 may provide heat to the coolant. The EWP 140 may be configured to push coolant through the engine 116 and an electric heater 224. When the engine 116 is running, heat from the engine 116 is transferred to the coolant. The engine coolant may flow through the HCIV 144, the electric heater 224, the AWP 142 and the heater core 230. In addition, the AWP 142 may also be turned on to assist the flow of coolant through the system.

Additionally, the HCIV 144 may be configured to allow coolant to flow through either the electric-only heating loop 210 or the combined heating loop 212. The HCIV 144 may be a three-way valve that allows one port to be alternately connected to each of the other two ports based on a commanded vehicle operating mode. The HCIV 144 may also be operated in such a way as to allow coolant to flow from the engine 116 to the electric heater 224, which forms the combined heating loop 212. Similarly, the ECV 146 may be configured to allow coolant to flow through the engine bypass loop 214 and/or the engine radiator loop 216.

The engine-radiator loop 216 cools the engine. The engine-radiator loop 216 may consist of an EWP 140 that is capable of pushing coolant through the engine 116 and radiator 222. The engine-radiator loop may also include a thermostat 218 that is capable of regulating the flow of coolant into the engine 116 based on the coolant temperature. Specifically, thermostat 218 allows coolant to flow through the engine radiator loop 216 when the coolant reaches a set-point threshold. The cooled fluid then flows back into the engine 116 and the process is repeated.

If electric heater 224 is inoperative or otherwise unable to provide desired heat, the controller may store a corresponding diagnostic code and control HCIV 144 in response to route coolant through the combined heating loop 212. Residual heat from engine 116 may be used to heat the coolant to a desired target temperature. Alternatively, or in combination, engine 116 may be started in response to heat the coolant to a target temperature. The system may determine that electric heater 224 is not functioning as expected by measuring and/or estimating power provided by battery 126 (shown in FIG. 1) under operating conditions where electric heater 224 is the only electrical component being used, such as at zero vehicle speed with the engine 116 off, for example. After minimizing other loads drawing battery power, the battery pack power usage should closely match electric heater power usage if the electric heater is functioning properly. The electrical power requirement of the electric heater 224 may be measured or estimated. The method may also work when other components are using electrical power so long as a measured or estimated power requirement is available for those other components.

Figure 3:
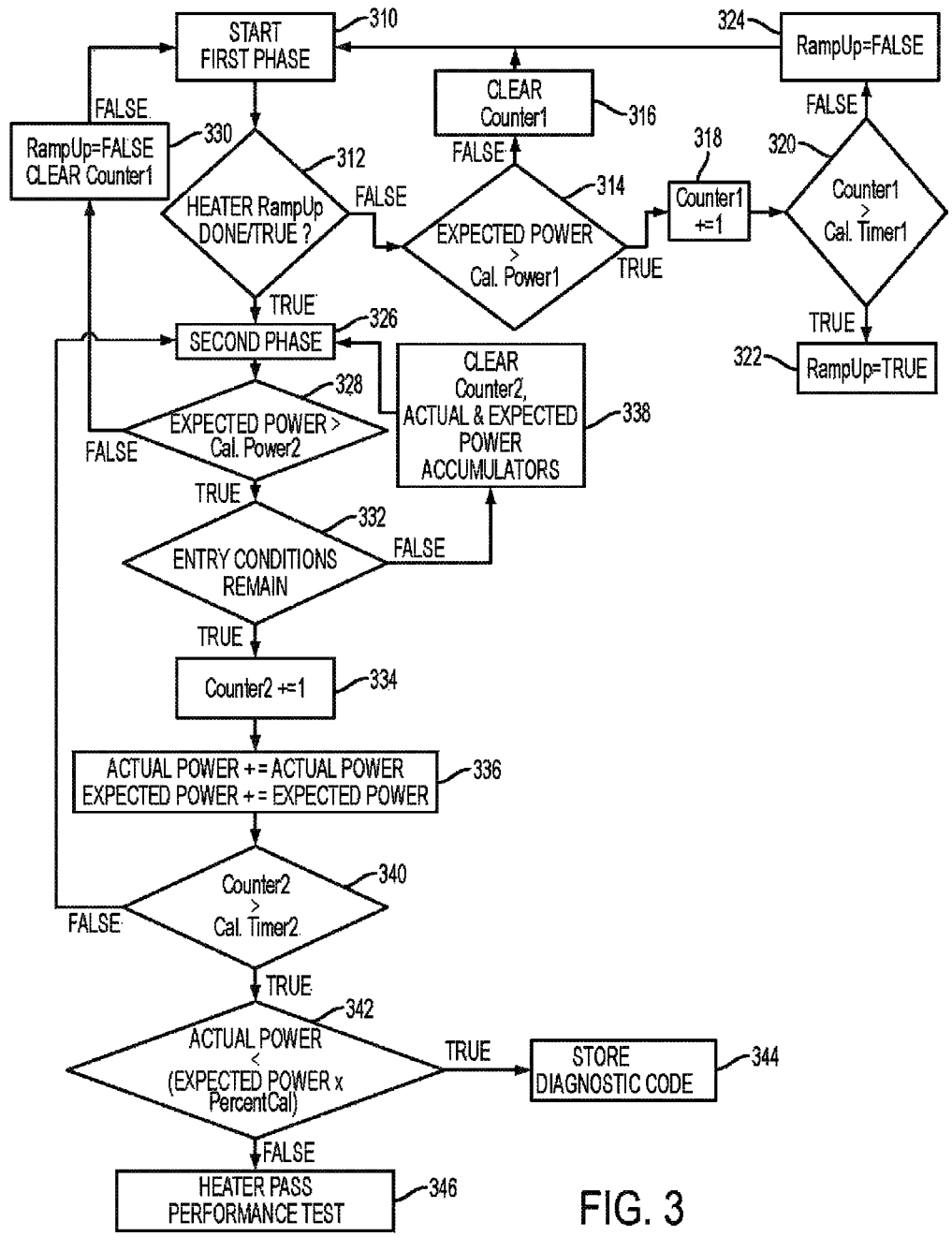
FIG. 3 is a flow chart illustrating operation of a system and/or method for operating an electric heater according to embodiments of the present disclosure.

FIG. 3 is a flow chart illustrating operation of a representative embodiment of a system or method for controlling an electric heater and/or vehicle having an electric heater according to the present disclosure. As those of ordinary skill in the art will understand, the functions represented in FIG. 3 may be performed by software and/or hardware depending on the particular application and implementation. The various functions may be performed in an order or sequence other than illustrated in FIG. 3 depending upon the particular processing strategy, such as event-driven, interrupt-driven, etc. Similarly, one or more steps or functions may be repeatedly performed, performed in parallel, and/or omitted under particular operating conditions or in particular applications, although not explicitly illustrated. In one embodiment, the functions illustrated are primarily implemented by software, instructions, or code stored in a computer readable storage device and executed by one or more microprocessor-based computers or controllers to control operation of the vehicle.

As illustrated in more detail in FIG. 3, whenever a heater is commanded on, a functionality test is run. The functionality test may include a first phase 310 and a second phase 326. During the first phase 310, the test evaluates whether the electric heater has completed a ramp-up cycle. The ramp-up cycle refers to the period of time necessary for the heater to reach full power. During the second phase 326, the test evaluates the operability of the electric heater. In particular, at block 312, it is determined whether the electric heater has completed a ramp-up cycle. If the heater has not completed a ramp-up cycle, then an estimated or measured expected power is compared with a first calibrated power threshold 314. Expected power is measured and/or estimated from the duty cycle or commanded heater power, coolant temperature and coolant flow rate. If the expected power is not greater than the first calibrated power threshold at 314, then a first counter is cleared 316 and the test returns to the beginning of the first phase of the test at block 310. Whereas, if the expected power is greater than the first calibrated power threshold at block 314, the first counter is incremented 318 and the first counter is compared with a first calibrated timer value 320 associated with the period of time required for the heater to reach full power. If the first counter is not greater than the first calibrated timer, then the ramp-up cycle is not complete 324 and the test returns to block 310. If the first counter is greater than the first calibrated timer value, then a ramp-up cycle is completed 322 and the test can move on to the second phase 326.

During the second phase of the test 326, it is determined whether the expected power is greater than a second calibrated power threshold 328. If the expected power is less than the second calibrated power threshold, the functionality test is restarted and returns to the start of the first phase 310. If the expected power is greater than the second calibrated power threshold at block 328, then the test evaluates whether entry conditions remain 332. Entry conditions 332 may include the following: vehicle speed is zero, engine is not running, the temperature sensor configured to measure temperature of coolant exiting the electric heater is operational, the AWP is operational and the HCIV is operational. In the alternative, the need to operate the vehicle at zero speed can be obviated by using a current sensor on the inverter, which can measure the actual consumption of the inverter system controller. The power consumption of the electric heater can then be calculated by subtracting out the power consumed by the inverter and other components (such as a DC/DC converter and AC compressor) from the total power output of the vehicle battery.

If entry conditions do not remain, then a second counter is cleared and all previously stored values of actual and expected power consumption are cleared 338 allowing the test to return to the start of the second phase 326. In contrast, if entry conditions remain, then the second counter is incremented at block 334. At block 336, actual and expected power consumption values are accumulated over a second calibrated timer value associated with the interval of time the second phase of the functionality test is to be run over. Actual power consumption of the heater may be based on a measured vehicle power consumption adjusted for power consumed by at least one vehicle component. To determine actual power consumed, power consumption may be integrated over the second calibrated timer value (energy consumption). Specifically, this may include taking battery power (voltage multiplied by current) and reducing it by the actual DC/DC converter consumption, the air conditioner consumption, inverter system controller and/or the transmission power consumption to end up with the actual power corresponding to heater power consumption.

At block 340, it is determined whether the second counter is greater than the second calibrated timer value. If the second counter is not greater, then the test returns to the start of the second phase 326. If the second counter is greater than the second calibrated timer value at block 340, then the actual energy consumption (actual power consumption integrated over the second calibrated timer) is compared with a threshold value at block 342, which is the expected energy consumption (the expected power consumption integrated over the second calibrated timer) adjusted for a predetermined percentage of allowable deviation. If the actual energy consumption is below this threshold value, then a diagnostic code is stored at 344. Whereas, if the actual energy consumption is within the allowable deviation, the heater passes the functionality test.

Alternatively, the actual and expected power consumption may be averaged over the second calibrated timer value and then compared with a corresponding threshold value based on an expected power value adjusted for allowable deviation. The instantaneous actual and expected power consumption may also be estimated or measured and compared with a corresponding threshold value to determine electric heater functionality.

In addition, the controller may be configured to execute other actions in response to storing of one or more diagnostic codes 344. Other actions may include, but are not limited to, storing a diagnostic code and/or starting the engine to provide heat to the vehicle. Other actions may also include controlling the HCIV to route coolant through the combined heating loop and activating an indicator within the vehicle. The indicator may be a light (e.g., a wrench light), a sound or a message. The purpose of the indicator is to alert the driver of a vehicle problem. Whenever there is a heat request, the controller is configured to perform the functionality test at least once per drive cycle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A method for controlling a hybrid vehicle having an engine and an electric heater, comprising:
    estimating an actual energy consumption, using a controller, of the electric heater in response to receipt of a heat request, the actual energy consumption being based on an actual power consumption of the electric heater over a predetermined period of time, wherein the actual power consumption is based on a measured total vehicle power consumption adjusted by subtracting power consumed by all vehicle components using electrical power other than the electric heater;
    comparing the actual energy consumption of the electric heater with a corresponding threshold using the controller; and
    starting the engine, using the controller, when the actual energy consumption is below the corresponding threshold.

2. The method of claim 1, wherein the measured total vehicle power consumption is based on power supplied by a traction battery.

3. The method of claim 1, wherein vehicle components include a DC/DC converter, air conditioning compressor or an inverter system controller.

4. The method of claim 1, wherein the actual energy consumption is estimated after the electric heater has achieved a minimum power upon being commanded on.

5. The method of claim 1, wherein the corresponding threshold is based on an expected electric heater power consumption, integrated over the predetermined period of time, adjusted for a predetermined percentage of deviation.

6. The method of claim 5, wherein the expected electric heater power consumption is estimated from coolant temperature and current electric heater duty cycle.

7. The method of claim 1, wherein the actual energy consumption of the electric heater is compared with the corresponding threshold after entry conditions have been met, the entry conditions including at least one of the following:
    a sensor configured to measure temperature of coolant exiting the electric heater is operational,
    a pump configured to force coolant through an electric-only heating loop is operational,
    a valve configured to selectively route coolant through at least one of the engine and the electric heater is operational,
    vehicle speed is zero, and
    the engine is off.

8. A method for controlling a hybrid vehicle having an engine and an electric heater, comprising:
    commanding the electric heater on; and
    starting the engine in response to an actual electric heater power consumption, based on measured total vehicle power consumption adjusted by subtracting power consumed by all vehicle components using electrical power other than the electric heater, being below a corresponding threshold.

9. The method of claim 8, wherein the actual electric heater power consumption is averaged over a predetermined interval of time.

10. The method of claim 8, wherein the actual electric heater power consumption is based on an instantaneous measurement of power consumption.

11. The method of claim 8, wherein the actual electric heater power consumption is integrated over a predetermined interval of time.

12. The method of claim 8, further comprising:
    storing a diagnostic code when the actual electric heater power consumption is below the corresponding threshold indicating inoperability of the electric heater.

13. The method of claim 8, further comprising:
    controlling a valve to selectively route coolant from the engine to a heater core to heat the vehicle when the actual electric heater power consumption is below the corresponding threshold.

14. A hybrid vehicle, comprising:
    an engine;
    an electric heater;
    a heater core;
    a valve positioned to route coolant through at least one of the engine and the electric heater to the heater core; and
    a controller configured to start the engine to provide heat to the vehicle in response to the electric heater being commanded on and an actual electric heater power consumption, based on a measured total vehicle power consumption adjusted by subtracting power consumed by all other vehicle components using electrical power other than the electric heater, being below a corresponding threshold.

15. The hybrid vehicle of claim 14, wherein the actual electric heater power consumption is averaged over a predetermined interval of time.

16. The hybrid vehicle of claim 14, wherein the actual electric heater power consumption is based on an instantaneous measurement of power consumption.

17. The hybrid vehicle of claim 14, wherein the actual electric heater power consumption is integrated over a predetermined interval of time.

18. The hybrid vehicle of claim 14, further comprising a sensor configured to measure a temperature of coolant exiting the electric heater, wherein the temperature is used by the controller, in combination with current duty cycle, to estimate an expected power consumption of the electric heater, and wherein the corresponding threshold is based on the expected power consumption adjusted for allowable deviation.

19. The hybrid vehicle of claim 14, wherein the measured total vehicle power consumption is based on power supplied by a traction battery.

20. The hybrid vehicle of claim 14, wherein vehicle components include a DC/DC converter, air conditioning compressor or an inverter system controller.

* * * * *